(12) United States Patent
Barlen et al.

(10) Patent No.: US 8,140,479 B2
(45) Date of Patent: Mar. 20, 2012

(54) LOGICAL CLASSIFICATION OF OBJECTS ON A COMPUTER SYSTEM

(75) Inventors: Thomas Barlen, Wolfsheim (DE); Daniel Paul Kolz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 11/614,111

(22) Filed: Dec. 21, 2006

(65) Prior Publication Data

US 2008/0154919 A1 Jun. 26, 2008

(51) Int. Cl.
*G06F 17/30* (2006.01)
(52) U.S. Cl. .................. 707/648; 707/672; 707/829
(58) Field of Classification Search .............. 707/648, 707/672, 676, 682, 607, 609
See application file for complete search history.

(56) References Cited

U.S. PATENT DOCUMENTS

| | | | | |
|---|---|---|---|---|
| 5,544,359 A * | 8/1996 | Tada et al. | ...... | 707/202 |
| 5,731,998 A * | 3/1998 | Lotito et al. | ...... | 702/189 |
| 5,825,944 A * | 10/1998 | Wang | ...... | 382/309 |
| 5,999,182 A * | 12/1999 | Etchemendy et al. | ...... | 715/853 |
| 6,012,094 A * | 1/2000 | Leymann et al. | ...... | 709/230 |
| 6,842,878 B1 * | 1/2005 | Johnson et al. | ...... | 715/853 |
| 7,076,508 B2 * | 7/2006 | Bourbonnais et al. | ...... | 1/1 |
| 7,213,037 B2 * | 5/2007 | Rangadass | ...... | 707/104.1 |
| 7,574,501 B2 * | 8/2009 | Louie et al. | ...... | 709/224 |
| 2002/0091718 A1 * | 7/2002 | Bohannon et al. | ...... | 707/202 |
| 2002/0143797 A1 * | 10/2002 | Zhang et al. | ...... | 707/200 |
| 2003/0074281 A1 * | 4/2003 | Hoffman et al. | ...... | 705/28 |
| 2003/0187809 A1 * | 10/2003 | Suermondt et al. | ...... | 706/46 |
| 2004/0093338 A1 * | 5/2004 | Akelbein et al. | ...... | 707/100 |
| 2004/0181442 A1 * | 9/2004 | Hensel et al. | ...... | 705/7 |
| 2004/0186762 A1 * | 9/2004 | Beaven et al. | ...... | 705/8 |
| 2004/0204980 A1 * | 10/2004 | Swedberg et al. | ...... | 705/10 |
| 2006/0230363 A1 * | 10/2006 | Rapp | ...... | 715/853 |
| 2007/0006203 A1 * | 1/2007 | Marwinski | ...... | 717/166 |
| 2007/0189288 A1 * | 8/2007 | Andrews et al. | ...... | 370/390 |
| 2007/0298385 A1 * | 12/2007 | Jenkins et al. | ...... | 434/156 |
| 2007/0300179 A1 * | 12/2007 | Friedlander | ...... | 715/781 |
| 2008/0071736 A1 * | 3/2008 | Smith | ...... | 707/3 |

FOREIGN PATENT DOCUMENTS

WO WO 9102304 A * 2/1991

OTHER PUBLICATIONS

Yongjian Fu; Sandhu K; ming-Yi Shih, A generalized-based approach to clustering of Web usage sessions 2000, Spring-Verlag, Berlin, 21-38.*
McIntosh, Stuart et al., Data Management on a Minicomputer, technical disclosure, Sep. 15, 2005, 12 pages, http://www.ip.com/pubview/IPCOM000128144D.

* cited by examiner

*Primary Examiner* — James Trujillo
*Assistant Examiner* — Fatima Mina
(74) *Attorney, Agent, or Firm* — Wood, Herron & Evans LLP (57) ABSTRACT

A method, apparatus and program product for classifying objects on a computer system. An audit journal of interactions with objects is evaluated to identify a plurality of logical groups of objects. A graphical construct, such as a hierarchical tree, is created from the plurality of logical groups. And, in response to user input directed to the graphical construct, at least one object is classified based upon a logical group within which the object is arranged.

15 Claims, 5 Drawing Sheets

LOGICAL CLASSIFICATION OF OBJECTS ON A COMPUTER SYSTEM

FIELD OF THE INVENTION

The present invention generally relates to computers and data processing and, more particularly, to classifying objects on a computer system.

BACKGROUND OF THE INVENTION

The details of any computer system can be overwhelming when trying to think about the system abstractly and conceptually. The number of files, database tables, and other objects makes it difficult for even the most diligent user to keep track of them all. Further, new objects are continuously being created on the system that a user does not know about. On complex systems, objects may be created by many users making the problem greater for system administrators that may need to work with large volumes of objects created by many different users. Classification of objects on a computer may help to alleviate some of the problems. For example, being able to classify objects and then group those objects by the class assists an administrator in performing general tasks such as backing up or archiving data. System security may be another application where being able to classify objects would assist the administrator. Access levels could be set based on classification with relative ease and with confidence that objects haven't been missed.

Computer security of financial data has become more important since the passage of the Sarbanes-Oxley Act. Chief information officers are now responsible for the security, accuracy and the reliability of the systems that manage and report financial data. Financial accounting and Enterprise Resource Planning systems are integrated in the initiating, authorizing, processing, and reporting of financial data and therefore need to be assessed for compliance with the Sarbanes-Oxley Act. So, although the Act places responsibility in corporate financial reporting on the chief executive officer (CEO) and chief financial officer (CFO), the chief information officer (CIO) also plays a significant role in ensuring that adequate controls are in place.

A key area of risk being scrutinized is the use of uncontrolled spreadsheets affecting regulatory reporting, P&L reporting or general ledger entries. Reducing the risk of errors in critical financial spreadsheets requires a spreadsheet inventory, risk assessment, remediation, and the deployment of a controlled environment that incorporates version control, access control, security and data integrity, change control, input control, documentation, archival and backup, and overall analytics.

This presents a problem when the administrator has to make decisions about the computer system at a policy level. For example, an administrator may wish to deny access to accounting data to any person who is not in the accounting department. It is difficult, however, to create a list of the objects that contain accounting data or to be sure the list is complete. An administrator may secure ninety-five percent of the objects but miss some because he or she was unaware the objects held accounting data. This particular problem may be more apparent on systems running large third party applications, which may not document which types of information are stored where.

The problem is also apparent in other aspects of maintaining a computer system. A similar problem exists when trying to back up certain types of information or make other types of information highly available. A company policy that specifies all customer order data be backed up nightly would be much easier to implement and take up less storage space if the administrator could be sure that he/she knew exactly which files contained the order data. Likewise, data archival of completed projects would pose similar problems for the administrator.

Classifying objects by format is a straightforward method utilizing file extensions, which already classify object types. Problems arise in this method when file extensions are common between unrelated applications. A better approach would be to classify objects based on their content rather than their type or format. However, there often is no easy way to classify objects on a system based on their content except to examine each one individually. Manual classification is often not a feasible method with modern computer systems having thousands or even millions of objects that the administrator would have to examine individually. Improperly classified or missed objects may lead to security issues if the classifications are being used to implement a security policy.

Therefore there is a need in the art to classify objects on a computer system without having to manually inspect each object.

SUMMARY OF THE INVENTION

The invention addresses these and other problems associated with the prior art by providing an apparatus, a program product, and a method that create logical groups of objects based at least in part on interactions with the objects as tracked by an audit journal. It is believed that the manner and frequency with which objects are accessed, as commonly tracked in a journal or log, can form the basis for logically classifying objects. These logical groups, which may or may not be capable of being refined in response to user input, may then be used by users for a wide variety of purposes, e.g. by administrators to implement computer policies such as security or backing up or archival of data.

Consistent with one aspect of the invention, a method for classifying objects on a computer system comprises evaluating an audit journal of interactions with the objects to identify a plurality of logical groups of objects. A graphical construct is created from the plurality of logical groups. In response to user input directed to the graphical construct, at least one object is classified based upon a logical group within which the object is arranged.

In some embodiments, a user or administrator may also combine a logical group selected from a plurality of logical groups with a logical group from a second plurality of logical groups, where the logical groups have a common classification and together form a combined logical group. Once formed, the logical group may then be used to modify a characteristic of the members of the group.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
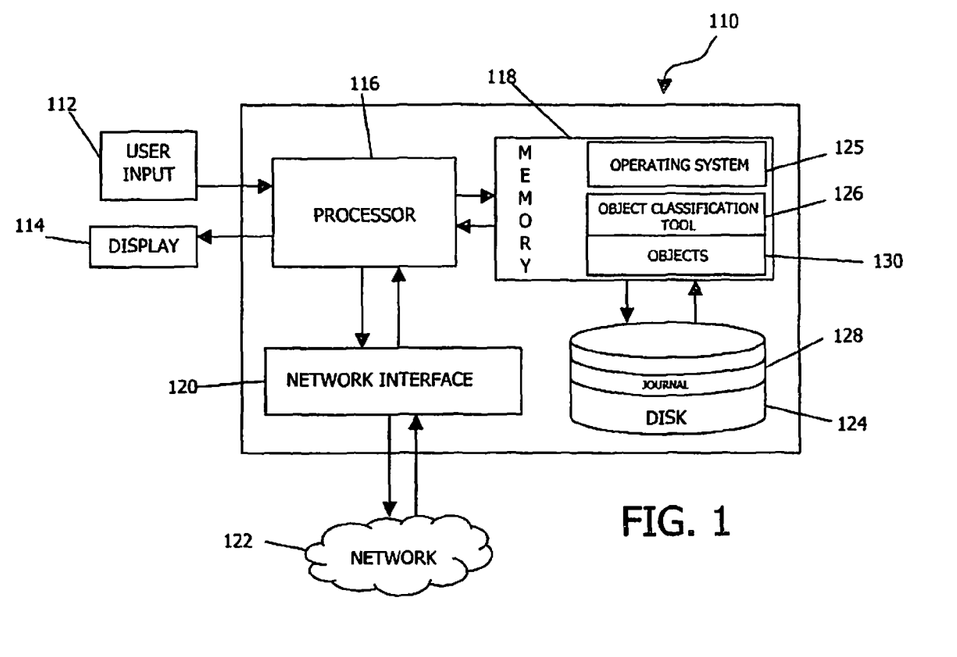
FIG. 1 is a block diagram of an exemplary hardware and software environment for a computer suitable for implementing journal-based object classification consistent with the invention.

Turning to the drawings, wherein like numbers denote like parts throughout the several views, FIG. 1 illustrates an exemplary hardware and software environment for an apparatus 110 suitable for implementing journal-based object classification consistent with the invention. For the purposes of the invention, apparatus 110 may represent practically any computer, computer system, or programmable device e.g., multi-user or single-user computers, desktop computers, portable computers and devices, handheld devices, network devices, mobile phones, etc. Apparatus 110 will hereinafter be referred to as a "computer" although it should be appreciated that the term "apparatus" may also include other suitable programmable electronic devices.

Computer 110 typically includes at least one processor 116 coupled to a memory 118. Processor 116 may represent one or more processors (e.g. microprocessors), and memory 118 may represent the random access memory (RAM) devices comprising the main storage of computer 110, as well as any supplemental levels of memory, e.g., cache memories, non-volatile or backup memories (e.g. programmable or flash memories), read-only memories, etc. In addition, memory 118 may be considered to include memory storage physically located elsewhere in computer 110, e.g., any cache memory in a processor 116, as well as any storage capacity used as a virtual memory, e.g., as stored on a mass storage device 124 or another computer coupled to computer 110 via a network 122.

Computer 110 also typically receives a number of inputs and outputs for communicating information externally. For interface with a user or operator, computer 110 typically includes one or more user input devices 112 (e.g., a keyboard, a mouse, a trackball, a joystick, a touchpad, a keypad, a stylus, and/or a microphone, among others). Computer 110 may also include a display 114 (e.g., a CRT monitor, an LCD display panel, and/or a speaker, among others). The interface to computer 110 may also be through an external terminal connected directly or remotely to computer 110, or through another computer communicating with computer 110 via a network 122, modem, or other type of communications device.

Computer 110 operates under the control of an operating system 125, and executes or otherwise relies upon various computer software applications, components, programs, objects, modules, data structures, etc. (e.g. object classification tool 126) collectively referred to as "objects" 130. Tool 126, for example, is used to classify various entities that may be resident in computer 100, e.g. software applications, components, programs, objects, modules, data structures, etc. Typical operating systems 125, as part of their general functionality, create records of transactions or interactions with the objects on the computer 110. These records are typically stored in files referred to as audit files, logs, or journals 128 that may be accessible by administrators of the computer 110. The various objects 130 may also execute on one or more processors in another computer coupled to computer 110 via a network 122, e.g., in a distributed or client-server computing environment, whereby the processing required to implement the functions of a computer program may be allocated to multiple computers over a network. A single master audit journal 128 may track the objects 130 for each of the client computers associated with a server in the client-server computing environment or each client computer may generate its own journal 128 of interactions with the objects 130.

Audit journals 128 from multiple computers 110 may be combined by an administrator to form a network or enterprise wide picture of computer activity. Analysis of these audit journals 128 by an object classification tool 126 to form logical groups may not be limited to the specific computer 110 that generated the audit journal 128, but may be performed on any of the computers in the network. Put another way, the analysis of an audit journal for the purpose of classifying objects may or may not be performed on the same computer as that upon which the objects reside and/or upon which the audit journal is generated.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Computer Data Logging

Classification of objects into logical groups on a computer or series of computers relies on the entries recorded in the audit journal on each of the computers. The audit journals are created as part of computer data logging, which exists on most robust computer systems. In computerized data logging, a computer program may automatically record events in a certain scope in order to provide an audit trail that can be used to diagnose problems. Most operating systems provide a syslog service or an equivalent, which allows the filtering and recording of log messages to be performed by a separate dedicated subsystem, rather than placing the onus on each application to provide its own ad hoc logging system.

An audit journal, also referred to as a log, audit file, or journal file, is a chronological sequence of entries, each of which contains evidence directly pertaining to and resulting from the execution of a business process or system function. Audit records typically result from activities such as transactions or communications by individual people, systems, accounts or other entities. The audit journal may record events by threads or process identifiers. For example on a computer 110 with a Unix operating system, when the user begins a new task, a shell command is issued and associated with an identifier, such as a process or thread id. That identifier is common to all interactions downstream and can be used to track data such as file open/close, application start/end, authority failures, and authority checks. Audit journals may also contain in addition to the identifier, information such as a timestamp of the event, a date stamp of the event, the event itself, and a status.

Creation of Hierarchical Trees

Figure 2:
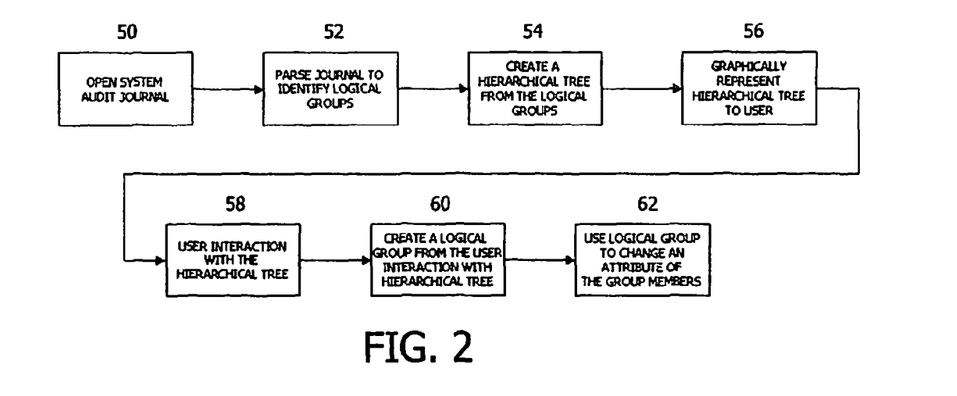
FIG. 2 is a flowchart of an exemplary process for classifying objects on the computer of FIG. 1.

An embodiment of the present invention uses an audit log or audit journal produced by a computer system to classify objects on the computer system. As shown in FIG. 2, the system audit journal is opened in block 50. The audit journal is parsed in block 52 to identify logical groups of objects, which may be in the form of threads or process ids. A hierarchical tree of the objects in the audit journal is created in block 54 utilizing the logical groups identified in block 52. Each node on the hierarchical tree represents a group of common objects. Under each node may be additional nodes further defining the groups of objects. The hierarchical tree may then be graphically displayed to the administrator in block 56. The hierarchical trees are graphical constructs utilized to graphically organize and display the objects in the audit journal for an administrator. Other graphical constructs that do not utilize a tree structure, such as Euler or Spider diagrams, or other graphical user interfaces may also be used to organize the objects in the audit journal. The hierarchical tree serves as a "first guess" which pares down and organizes the search space for an administrator to facilitate in selecting objects that he or she was looking for.

Once displayed, the administrator may interact with the hierarchical tree in block 58, selecting nodes on the tree that will define groups of objects or creating new trees by combining branches of the current hierarchical tree with branches of other trees with common nodes. One of the benefits of using the graphical hierarchical tree is that it allows administrators to process objects in groups based upon similarities, saving the administrator time and effort. Once the administrator has selected a node on a tree or has created a combined tree, logical groups of objects may be created in block 60 from the objects subordinate to the node of a branch of a tree or combined tree. The administrator may then use the logical group of objects to change an attribute of the group in block 62, or may use the logical group object listing to backup, archive or move the objects in the group.

Figure 3:
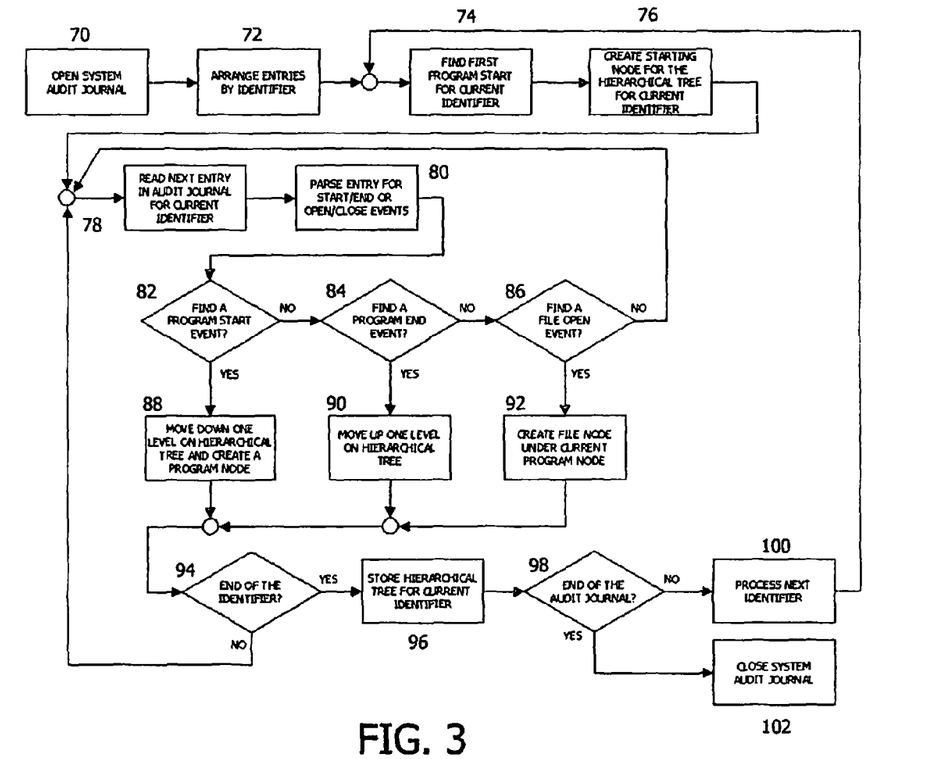
FIG. 3 is a flowchart of an exemplary method for generating a hierarchical tree from an audit journal file on the computer of FIG. 1.

An exemplary process for creating a hierarchical tree is shown in FIG. 3. A system audit journal is opened in block 70. The entries in the audit journal may be arranged by a common identifier, such as a process id or a thread, in block 72. The audit journal is then parsed. A first program start is encountered for the current common identifier in block 74 and a corresponding program node is created on a hierarchical tree in block 76.

The next entry from the audit journal is then read for the current common identifier in block 78 and the entry is parsed looking for Start/End or Open/Close events in block 80. A number of different actions may occur depending on the type of event encountered in the audit journal. For example, if a program start is encountered (decision block 82), a new program node is associated with the current node, but created one level down on the hierarchical tree in block 88. If a program end is encountered (decision block 84), the current level on the tree is moved up one level to the parent node of the current node in block 90. If a file open is encountered (decision block 86), a file node is created under the current node in block 92. Generally a file node will not have any child nodes beneath it, unless the file is a logical file, representing one or more physical files in which case the physical files will be the children under the logical file node.

After the entry has been parsed and the appropriate action has been completed, a check may be made to determine if the last of the current common identifier entries has been encountered (decision block 94). If not, then the next entry is read in block 78 and the process continues until reaching the end of the identifier. When the last entry of the identifier is encountered in the audit journal, that portion of the hierarchical tree may be stored in block 96 and a check is made for the end of the audit journal (decision block 98). If an end is encountered, then the audit journal is closed and processing to build the hierarchical tree is complete in block 102. If an end of the audit journal is not found then the process continues with the next common identifier 100 until all common identifiers have been processed.

Figure 4A:
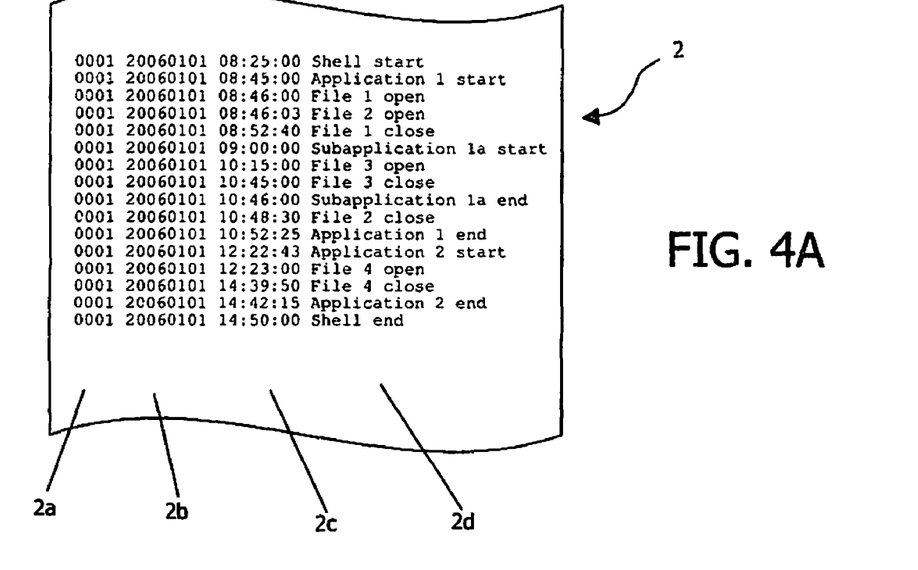
FIG. 4A is an example of a segment of an audit journal created on the computer of FIG. 1.
Figure 4B:
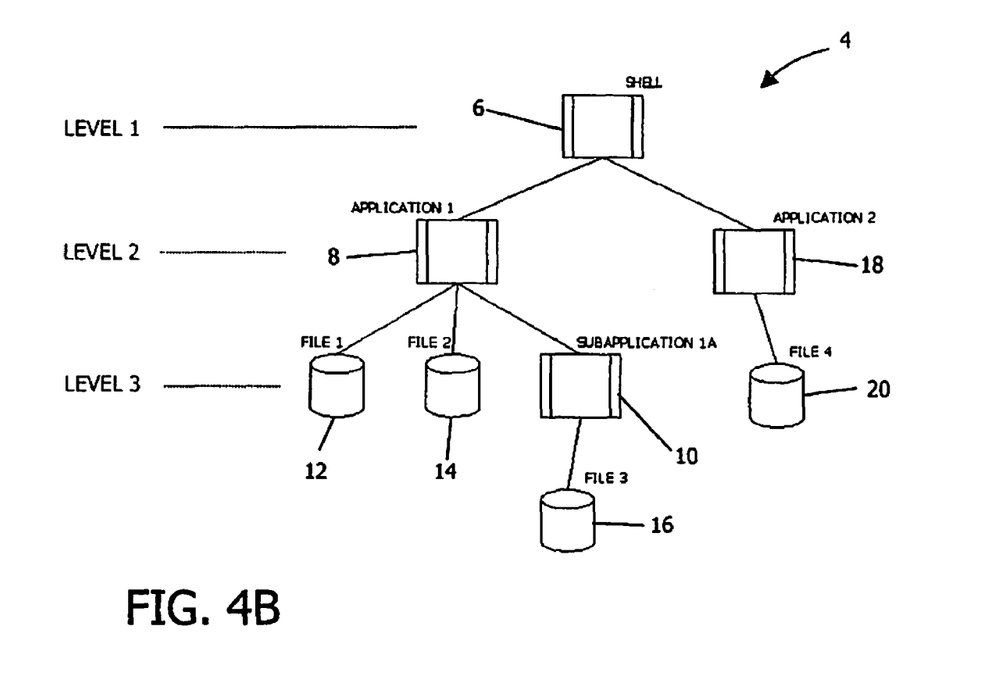
FIG. 4B is a block diagram of an example of a hierarchical tree representing the segment of the audit journal of FIG. 4A.

The process described above in FIG. 3 may be used to build an exemplary hierarchical tree in FIG. 4B from the audit journal in FIG. 4A. A segment 2 of an exemplary audit journal shown in FIG. 4A is opened and the entries in the audit journal are arranged by a common identifier such as a process or thread id. The information in this segment 2 contains items such as the identifier 2a, date stamp 2b, time stamp 2c, and activity 2d. The "Shell start" activity in the segment 2 is the first occurrence of a program start located in the audit journal. The starting program node 6 for the hierarchical tree 4 is created for the shell start.

The next entry in the audit journal is a program start activity. A program node 8 is created down one level (Level 2 on the hierarchical tree) from the starting program node 6 and connected as a child program of node 6. Occurrences of the opening of Files 1 and 2 are encountered in the segment 2 of the audit journal, resulting in file nodes 12 and 14 being connected to program node 8. When the start of the sub-application is encountered in the segment 2 of the audit journal, a program node 10 is created down one level (Level 3 on the hierarchical tree) as a child of the parent program node 8. A file node 16 is created for File 3, which is associated with the sub-application of program node 10.

When the sub-application end is encountered in the segment 2 of the audit journal, creation of new nodes would move up one level in the hierarchical tree (from Level 3 to Level 2). Likewise, when end of application 1 is encountered in the segment 2 of the audit journal, creation of new nodes would move up one level in the hierarchical tree (from Level 2 to Level 1). When the start of application 2 is encountered in the segment 2 of the audit journal, a new program node 18 is created down one level and associated with, in this case, the program node 6. Likewise, an appropriate file node 20 is created when File 4 is encountered in the segment 2 of the audit journal. When the entire common identifier in the segment 2 of the audit journal has been processed, the resulting hierarchical tree may be presented to the administrator Those skilled in the art will recognize that the exemplary method illustrated in FIGS. 3, 4A and 4B for creating hierarchical trees is only one of many methods that could be employed to create hierarchical trees. Indeed, those skilled in the art will recognize that other embodiments may use other methods of creating a hierarchical tree involving more than program and/or file objects without departing from the scope of the invention that may allow for a more detailed definition than just at the file level, where an object, for example, may be a row or column in a table in a database.

Creation of Logical Groups of Objects

Once the hierarchical trees, such as the sample tree 4 in FIG. 4B, are created, they may be presented to a user, such as a computer administrator. The administrator may then manipulate the hierarchical tree directly or combine branches of one tree with branches of a second tree prior to creating logical groups of objects from the hierarchical trees.

Figure 5:
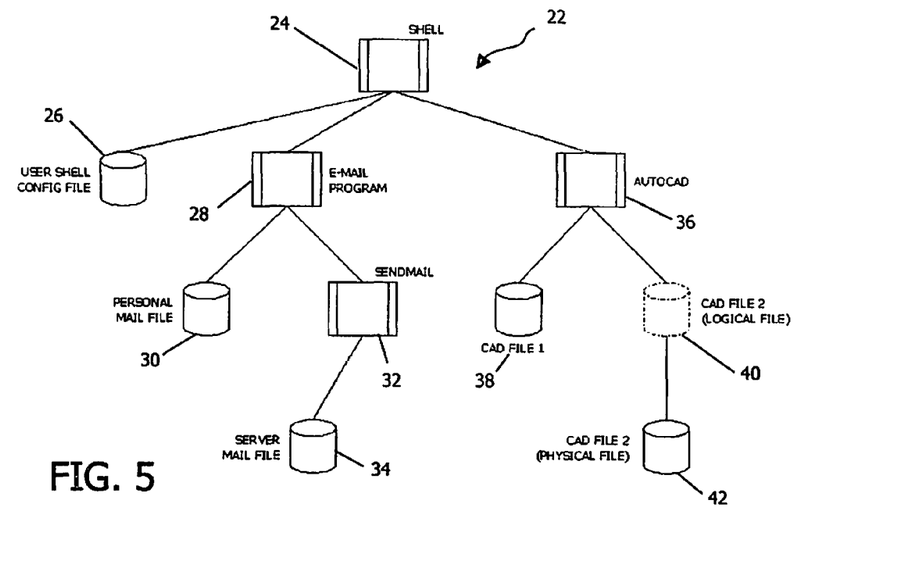
FIG. 5 is a block diagram of an example of a hierarchical tree from a user session on the computer of FIG. 1.
Figure 6:
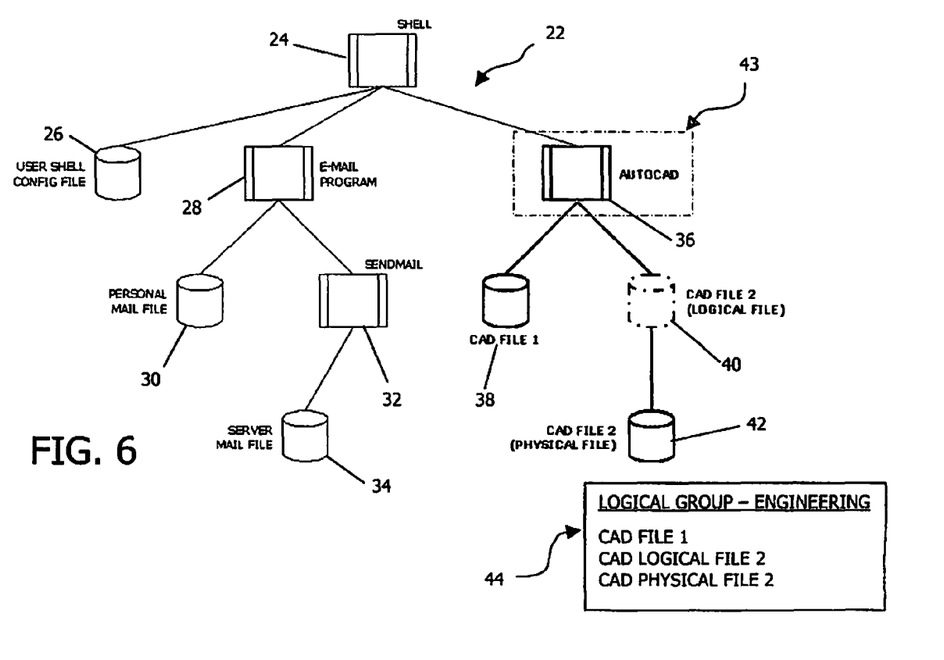
FIG. 6 is a block diagram showing the selection of a node of the hierarchical tree of FIG. 5 and the resulting logical group.

FIGS. 5 and 6 show an exemplary hierarchical tree 22 which may result from a simple computer session of an engineer. The goal of this example is for the administrator to create a logical grouping of the objects, which contains engineering data, to assist in creating daily backups of the engineering work. In hierarchical tree 22, the engineer's first program is the shell or interactive environment, which will run everything else. When it starts, it reads the user's shell configuration file 26. Next, the engineer checks his or her e-mail by starting the e-mail program 28. The program loads the user's local mail file 30. The engineer sends a note, which makes a call to the sendmail program 32. Sendmail 32 records the note in a server mail file 34 to send when the next batch send cycle occurs. Having finished with e-mail, the engineer starts an engineering application, AUTOCAD® 36, which is his primary work environment. In AUTOCAD 36, both CAD file 1 38 and CAD file 2 40 are used. CAD file 2 40 is a logical file or symbolic link so the physical file for CAD file 2 42 must also be accessed.

The administrator would like to create a list of all of the objects that contain engineering information, or are used to process engineering information. To do this, the administrator would select the node labeled "AUTOCAD" as shown by the selection box 43 in FIG. 6. This would implicitly select all of the files used by this program during its execution as shown by highlighted nodes 36-42 in the hierarchical tree 22 in FIG. 6. The administrator may then be shown a screen indicating which objects will be classified as engineering information 44.

In a scenario where the administrator looks at the graphical representation of the hierarchical tree and finds that a particular branch or sub-tree of program execution and object access no longer has anything to do with the nodes above it, the administrator may click the node to deselect the branch. An example of this situation would be where CAD file 2 from above is actually a general-purpose template and not really considered engineering data. The administrator could click on the node for the CAD file 2 (logical file) 40 to deselect both the logical file node 40 and the corresponding physical file node 42.

Figure 7:
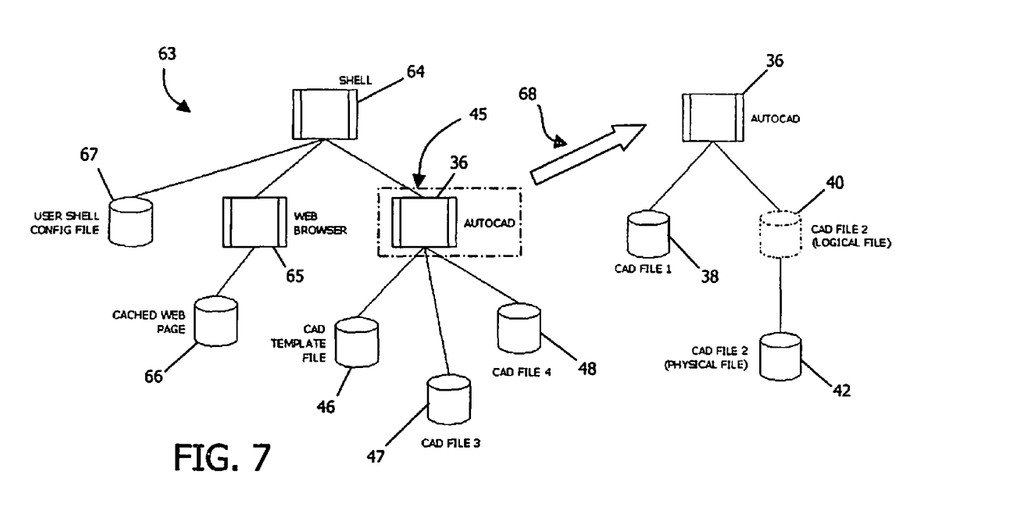
FIG. 7 is a block diagram showing the user action of selecting a node from a second hierarchical tree to combine with the node selected in FIG. 6.
Figure 8:
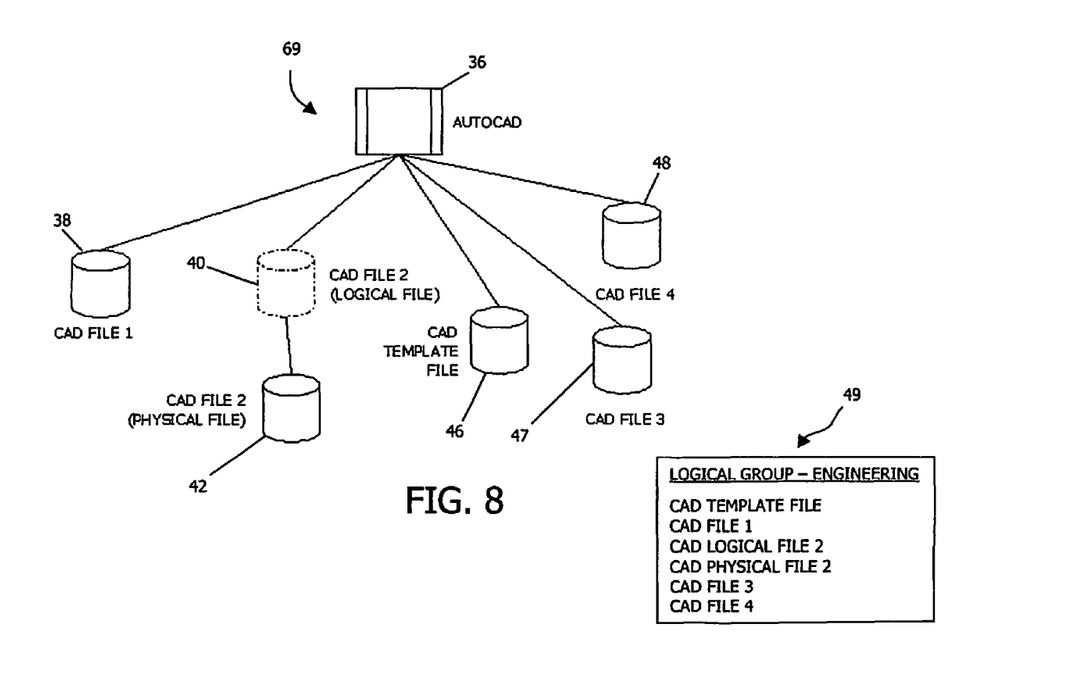
FIG. 8 is a block diagram showing the resulting combination tree and resulting logical group from FIG. 7.

In order to capture the objects for a group or a department, the administrator may need to look at multiple hierarchical trees from multiple users. The administrator may build custom hierarchical trees by combining branches of different trees at common nodes as shown in FIGS. 7 and 8. As discussed above, the administrator has selected the branch of the hierarchical tree 22 in FIG. 6 at the AUTOCAD 36 node. The administrator may now bring up a hierarchical tree 63 from a different engineer or the tree may be from a subsequent session by the same engineer. In this session, the engineer used a web browser to view information on the Internet or an intranet and then entered an AUTOCAD 36 session. During the AUTOCAD 36 session, the engineer accessed custom template file 46, CAD file 3 and CAD file 4. The administrator may select the AUTOCAD 36 node with selection box 45 and then drag this box as indicated diagrammatically by arrow 68 to the branch of hierarchical tree 22 that was selected in FIG. 6. The combination hierarchical tree 69 may be seen in FIG. 8. This combination hierarchical tree 69 may then be used to generate the logical group of objects 49, which may include all of the CAD files, the CAD template and the Logical Link. The administrator may now operate on logical group 49. In alternate embodiments, the computer system 110 may find related branches of hierarchical trees and automatically merge them without additional interaction from the administrator.

Attribute Modification of Logical Groups of Objects

Continuing with the scenario above, the administrator now has a logical group of objects 49, on which he can operate. The original goal for the engineering data was to create a list of objects to be part of a daily backup. The administrator may now use this logical group of objects 49 to create his daily backup list. The administrator may also continue to use the hierarchical trees to update his list of items to be backed up by adding new branches from new hierarchical trees to the engineering hierarchical tree 69 in FIG. 8.

Another use for logical groups of objects may be for access control and security. In a scenario for Sarbanes-Oxley, where the focus is security and access control, and referring to FIG. 9, the integrity of data generated by a business is fundamental to its ability to report accurately. There should be clear separation of duties between those entering financial information 104 and those who are generating reports 106, 107 based on the financial data 105. Those who generate reports 106 should not be allowed to change the data 105. The possibility that they are changing the data 105 not to correct it but to adjust what the report shows is too high. Therefore it is important to identify all pieces of financial data before it can be ensured that those who generate reports cannot change the data.

Using the methodology above, logical groups of objects of the financial data may be created from hierarchical trees.

Figure 9:
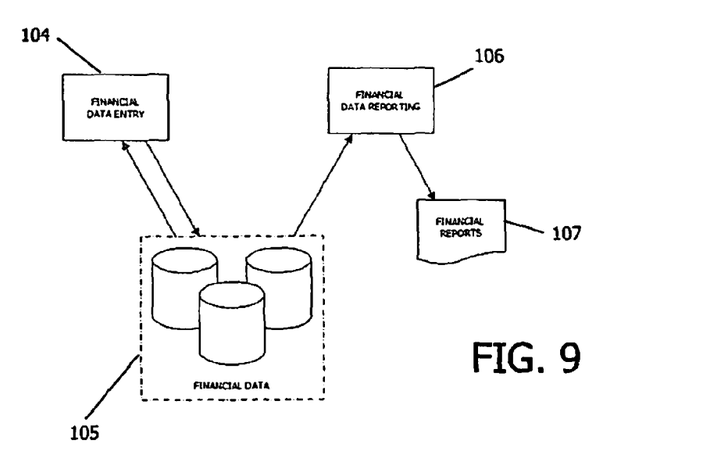
FIG. 9 is a block diagram of a scenario showing access to financial data in the computer of FIG. 1.

These logical groups may then be used by an administrator to set access control to the financial data 105. Full read/write access may be given to the group or department responsible for entering the financial data 104. Read only access may be given to groups or departments that are responsible for reviewing the financial data and generating reports 106. The financial data may also be restricted, giving no access to other groups or departments in a corporation. The logical groups of objects created from the hierarchical trees assist the administrator in creating a security policy suitable for the computer systems and network while complying with the Sarbanes-Oxley rules and regulations. Other applications where object classification may be useful would be in the health care field where securing data must comply with HIPPA regulations.

While the objects in the logical groups discussed above consist mainly of program and file objects, any object on which access permissions can be set or any object that can be managed may also be included. These additional objects may include devices, queues, pipes, sockets, spool files, etc. In addition it will be appreciated that any number of operations relevant to particular objects may be logged and used to group objects. Likewise, while the logical groups discussed above were used for data archival or backups and security, logical groups may be used for any configuration type activity that will be apparent to those skilled in the art, including auditing, caching attributes, quality of service parameters, etc.

Data mining of the audit journals discussed above is done for the purposes of determining user interaction with a computer to classify the objects. While the approaches above show sorting and analysis done by a unique identifier, of a process id for example, any sorting or filtering may be done to organize and analyze the data, i.e. sorting or filtering by thread, user, computer, etc. Likewise, specialized algorithms such as deterministic algorithms or any statistical mining approaches may be used to analyze the data in the audit journals. Once the hierarchical trees and logical groups are created, they may be saved or stored in any number of ways, such as in relational database tables, XML, etc.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A method for classifying objects on a computer system, the method comprising:
    evaluating an audit journal of interactions with the objects on the computer system, wherein the audit journal is created as part of computer system data logging;
    identifying a plurality of logical groups of objects in response to evaluating interactions in the audit journal, wherein at least one logical group among the plurality of logical groups includes a plurality of objects identified as common with one another based upon at least one interaction evaluated in the audit journal;
    automatically creating a graphical construct representing the plurality of logical groups as identified in response to evaluating interactions in the audit journal; and
    in response to user input directed to the graphical construct, classifying at least one object based upon a logical group within which the object is arranged;
    wherein the graphical construct is a hierarchical tree, wherein the objects comprise data objects and program objects, wherein identifying the plurality of logical groups of objects includes identifying a first logical group of objects as including a plurality of data objects based upon a determination from an evaluation of interactions in the audit journal that the plurality of data objects were accessed by a common program object, and wherein the method further comprises:
        selecting a logical group from the plurality of logical groups in the hierarchical tree; and
        combining the logical group selected with a logical group from a second plurality of logical groups, wherein the logical group selected has a common classification with the logical group from the second plurality of logical groups forming a combined logical group.

2. The method of claim 1 wherein the graphical construct is an Euler diagram.

3. The method of claim 1 wherein the graphical construct is a spider diagram.

4. The method of claim 1 wherein the audit journal comprises a record of activities of at least one of program starts, program ends, file opens, file closes, authority failures, authority checks, or other system related actions.

5. The method of claim 1 wherein creating the hierarchical tree further comprises:
    determining a hierarchy between a first object in a logical group from the plurality of logical groups and a second object in the logical group from the plurality of logical groups; and
    associating the first object with the second object based on the hierarchy.

6. The method of claim 1 further comprising:
    modifying a characteristic of the combined logical group.

7. The method of claim 6 wherein the characteristic of the combined logical group is an access control.

8. The method of claim 1 further comprising:
    moving the objects associated with the combined logical group to a new location.

9. The method of claim 1 further comprising:
    storing the hierarchical tree for subsequent use.

10. An apparatus comprising:
    a memory; and
    program code configured to classify objects on a computer system, the program code resident in the memory and configured to evaluate an audit journal of interactions with the objects on the computer system, wherein the audit journal is created as part of computer system data logging, identify a plurality of logical groups of objects in response to evaluating interactions in the audit journal, wherein at least one logical group among the plurality of logical groups includes a plurality of objects identified as common with one another based upon at least one interaction evaluated in the audit journal, automatically create a graphical construct representing the plurality of logical groups as identified in response to evaluating interactions in the audit journal, and in response to user input directed to the graphical construct, classify at least one object based upon a logical group within which the object is arranged;
wherein the objects comprise data objects and program objects, wherein the program code is configured to identify a first logical group of objects as including a plurality of data objects based upon a determination from an evaluation of interactions in the audit journal that the plurality of data objects were accessed by a common program object, wherein the graphical construct is a hierarchical tree, wherein the program code is further configured to select a logical group from the plurality of logical groups in the hierarchical tree, and combine the logical group selected with a logical group from a second plurality of logical groups, and wherein the logical group selected has a common classification with the logical group from the second plurality of logical groups forming a combined logical group.

11. The apparatus of claim 10 wherein the audit journal comprises a record of activities of at least one of program starts, program ends, file opens, file closes, authority failures, authority checks, or other system related actions.

12. The apparatus of claim 10 wherein the graphical construct is a hierarchical tree and wherein the program code is further configured to determine a hierarchy between a first object in a logical group from the plurality of logical groups and a second object in the logical group from the plurality of logical groups; and associate the first object with the second object based on the hierarchy.

13. A program product, comprising:
a non-transitory computer readable medium; and
a program code configured to classify objects on a computer system, the program code resident on the computer readable medium and configured to evaluate an audit journal of interactions with the objects on the computer system, wherein the audit journal is created as part of computer system data logging, identify a plurality of logical groups of objects in response to evaluating interactions in the audit journal, wherein at least one logical group among the plurality of logical groups includes a plurality of objects identified as common with one another based upon at least one interaction evaluated in the audit journal, automatically create a graphical construct representing the plurality of logical groups as identified in response to evaluating interactions in the audit journal, and in response to user input directed to the graphical construct, classify at least one object based upon a logical group within which the object is arranged; wherein the objects comprise data objects and program objects, wherein the program code is configured to identify a first logical group of objects as including a plurality of data objects based upon a determination from an evaluation of interactions in the audit journal that the plurality of data objects were accessed by a common program object, wherein the graphical construct is a hierarchical tree, wherein the program code is further configured to select a logical group from the plurality of logical groups in the hierarchical tree, and combine the logical group selected with a logical group from a second plurality of logical groups, and wherein the logical group selected has a common classification with the logical group from the second plurality of logical groups forming a combined logical group.

14. The program product of claim 13 wherein the audit journal comprises a record of activities of at least one of program starts, program ends, file opens, file closes, authority failures, authority checks, or other system related actions.

15. The program product of claim 13 wherein the graphical construct is a hierarchical tree and wherein the program code creating the hierarchical tree is further configured to determine a hierarchy between a first object in a logical group from the plurality of logical groups and a second object in the logical group from the plurality of logical groups; and associate the first object with the second object based on the hierarchy.

\* \* \* \* \*